United States Patent Office 3,006,935
Patented Oct. 31, 1961

3,006,935
NEW POLYGLYCOL ETHER DERIVATIVES
Otto Albrecht, Neuewelt, Switzerland, assignor to Ciba Limited, Basel, Switzerland
No Drawing. Filed July 9, 1956, Ser. No. 596,392
Claims priority, application Switzerland July 15, 1955
9 Claims. (Cl. 260—404.5)

This invention provides new polyglycol ether derivatives, in which each carbon atom bound to an oxygen atom is bound to a single oxygen atom, and which contain the radical of a nitrogenous base of the formula (1) 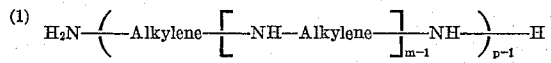

in which $m$ represents a small whole number and $p$ represents the whole number 1 or 2, and in which at least two aliphatic or cycloaliphatic radicals together containing at least 20 carbon atoms are bound to nitrogen atoms, at least one of which radicals is a hydrocarbon radical and at most one is an acyl radical.

The invention also provides a process for the manufacture of the aforesaid polyglycol ether derivatives, wherein a polyglycol ether chain is introduced, advantageously with the aid of ethylene oxide, into a compound derived from a nitrogenous base of the Formula 1 which compound contains bound to nitrogen atoms at least one hydrogen atom and at least two aliphatic or cycloaliphatic radicals together containing at least 20 carbon atoms, at least one of which radicals is a hydrocarbon radical and at most one is an acyl radical of a fatty acid or cycloaliphatic acid, and in which compound each carbon atom bound to an oxygen atom is bound to a single oxygen atom.

As starting materials there are advantageously used secondary monamines which contain bound to the nitrogen atom two aliphatic hydrocarbon radicals together containing at least 20 carbon atoms, for example, amines of the formula (2) 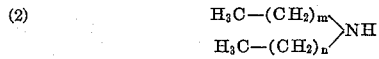

in which $m$ and $n$ represent whole numbers of at least 7 and $m+n$ is at least 18. It is of advantage to use a dialkylamine which contains two identical unbranched alkyl groups each having an even number of carbon atoms, since these amines are easily obtainable. As examples there may be mentioned di-(n-decyl)-amine, di-(n-dodecyl)-amine, di-(n-tetradecyl)-amine, di-(n-hexadecyl)-amine and di-(n-octadecyl)-amine. It will be understood that a mixture of two or more of the said amines may be used, and, if desired, the mixture may contain a certain amount of an amine of lower molecular weight such as di-(n-octyl)-amine.

Further starting materials for making the polyglycol ether derivatives of the foregoing constitution are N-alkyl-N-acyl-compounds of the formula (3) 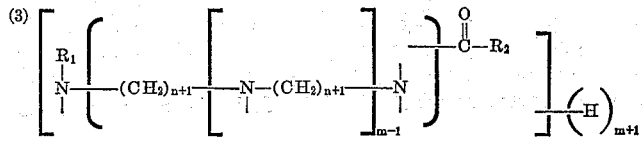

in which $R_1$ and $R_2$ represent aliphatic hydrocarbon radicals, and the radicals $R_1$ and $-OC-R_2$ together contain at least 20 carbon atoms and each of these radicals contains at least 8 carbon atoms, and in which $m$ and $n$ each represent a whole number of at most 2.

The latter N-alkyl-N-acyl-compounds can be prepared by monoacylating an N-monoalkyl-ethylene diamine, an N-monoalkyl-propylene diamine, an N-monoalkyl-diethylene triamine or an N-monoalkyl-dipropylene triamine, and so selecting the two starting materials that the alkyl group and also the acyl radical contains at least 8 carbon atoms and both together contain at least 20 carbon atoms. As N-monoalkylamino-compounds to be acylated in this manner there may be used, for example, the ordinary commercial N-alkyl-propylene diamines obtained from tall oil or soya bean oil. They are advantageously acylated with fatty acids of high molecular weight, such as capric acid, myristic acid, lauric acid (for example in the form of coconut oil fatty acid), palmitic acid, stearic acid, arachic acid, behenic acid, undecylenic acid, oleic acid or elaidic acid.

In this connection it may be mentioned that it is of advantage in the present process to convert into polyglycol ethers those starting materials which correspond to the formula (4) 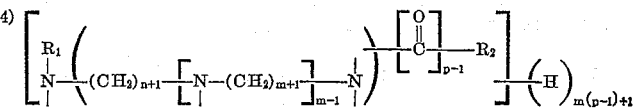

in which $R_1$ and $R_2$ represents aliphatic hydrocarbon radicals, $R_1$ and $-(OC)_{p-1} R_2$ together contain at least 20 carbon atoms, and $m$, $n$, and $p$ each represent a whole number of at most 2. From compounds of the Formula 4 there are obtained polyglycol ether derivatives of the formula (5) 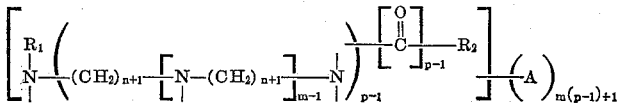

in which $R_1$, $R_2$, $m$, $n$ and $p$ have the meanings given above, and A represents a radical of the constitution $(CH_2-CH_2-O)_{k-1}-CH_2-CH_2-OH$, in which $k$ is a whole number.

The nitrogenous compound is reacted with ethylene oxide by methods in themselves known, advantageously at a raised temperature and with the exclusion of atmospheric oxygen, preferably in the presence of a suitable catalyst, for example, a small amount of an alkali metal or an alkali metal hydroxide, carbonate or acetate.

It is of advantage to additively combine 1 mol of the base with at least about 20 mols of ethylene oxide, and especially valuable polyglycol ether derivatives are obtained by reacting a quantity of ethylene oxide such that the reaction product contains an average of 40–100 —CH₂—CH₂—O— groups.

The products so obtained, which contain at least one basic tertiary nitrogen atom, can be converted in known manner into salts thereof, for example, acetates, or, if desired, into quaternary ammonium salts, and used in that form.

The new polyglycol ether derivatives can also be obtained by introducing into a nitrogenous compound of the above constitution a polyglycol ether chain with the aid of a compound containing such a chain. As compounds of the latter kind polyglycol ether halides are especially suitable.

The new polyglycol ether derivatives are very suitable as agents for shifting the dyestuff equilibrium between an aqueous liquor and nitrogenous fibers, especially wool. As is known, there exists in a system consisting of an aqueous liquor, nitrogenous fibers and a dyestuff having an affinity for the fibers, an equilibrium depending on time between the quantity of dyestuff dissolved in the liquor and the quantity thereof fixed on the fiber. Under the usual dyeing conditions this equilibrium is so adjusted that by far the greater proportion of the dyestuff is fixed on the fiber and only a very small residual amount remains dissolved in the bath. Agents are known which are capable of shifting the equilibrium in favor of the liquor; in suitable, preferably small, quantities such agents have the effect, especially in the case of dyestuffs that are rapidly and almost completely absorbed by the fiber, only of retarding the dyeing process so that the dyeing obtained is hardly weakened at all, but is decidedly more level, and this is known as a levelling action. However, the aforesaid agents, especially when added in larger quantities, are capable of reversing the dyeing process so that dyestuff is removed from the dyed fibers up to a point very far removed from the original equilibrium.

It has been found that the polyglycol ether derivatives of this invention are especially suitable for shifting the equilibrium, that is to say, they are suitable as additions in dyeing or lightening or stripping dyeings. The conditions used for this purpose are those customarily used.

As dyestuffs there may be used for dyeing the known dyestuffs, for example, those containing metal in complex union, applied from an acid or neutral bath to nitrogenous fibers such as wool. Especially valuable results are produced with complex metal compounds, advantageously complex chromium or cobalt compounds of monoazo-dyestuffs in which one atom of metal is bound in complex union with two molecules of azo-dyestuff, and which metal compounds are free from carboxylic acid and sulfonic acid groups or contain not more than one such group. With these dyestuffs wool or other nitrogenous fibers can be dyed in known manner usually from weakly acid, for example, acetic acid, to neutral baths. In order to produce a levelling effect, or in order to avoid the unlevel dyeing of wool, the polyglycol ether derivative may be added to the dyebath at the same time as the dyestuff. However, it is especially advantageous first to treat the fibrous material, for example, wool, advantageously at a raised temperature, in a bath containing the polyglycol ether derivative, and to add the dyestuff later. The quantity of the polyglycol ether derivative added to the dyebath may vary within wide limits. Usually, for example, a quantity within the range of 0.1 to 2 percent calculated on the weight of the fibrous material, may be added. The greater the quantity added the greater, generally speaking, is the levelling effect, but the more is the equilibrium shifted in favor of the liquor. In dyeing with the aid of the polyglycol ether derivatives of the invention not only can the aforesaid levelling effect be produced, which can also be used for the level dyeing of wools having different properties, for example, chlorinated and unchlorinated wool, but further advantageous effects have been observed, for example, that the fastness to rubbing of the dyeings is not impaired thereby, whereas it is considerably reduced when other levelling agents previously proposed are used.

The polyglycol ether derivatives of the invention can be used as stripping agents or lightening agents for treating dyeings produced on the aforesaid fibers with any desired dyestuffs, for example, those which are suitable for dyeing from strongly acid (sulfuric acid) or weakly acid (acetic acid) baths, and contain metal bound in complex union or advantageously dyestuffs free from metal bound in complex union. Depending on the effect desired there may be added to the bath, for example, 1-10 percent of the polyglycol ether derivative calculated on the weight of the wool. There may, of course, be used for stripping dyeings other stripping agents, for example, reducing agents suitable for this purpose, such as sodium hydrosulfite, in addition to the polyglycol ether derivatives.

The new polyglycol ether derivatives, especially those of the above constitution containing acylamino-groups, are useful not only for the purpose mentioned above, but also as softening agents, for example, for viscose artificial silk.

The following examples illustrate the invention, the parts and percentages being by weight:

*Example 1*

30 parts of an ordinary commercial mixture of secondary amines containing unbranched alkyl groups, and composed of about 8 percent of dioctylamine, 9 percent of didodecylamine, 47 percent of didodecylamine, 18 percent of ditetradecylamine, 8 percent of dihexadecylamine and 10 percent of dioctadecylamine are heated in a current of nitrogen to 120° C., then 0.3 part of metallic sodium is added, and ethylene oxide is introduced in the form of a finely distributed gas stream until 212 parts thereof have been absorbed. The new polyglycol ether derivative is a light wax-like mass, which is readily soluble in water.

It can be used as a levelling agent in the production of dyeings with acid wool dyestuffs, and also for overcoming unlevel dyeing of wool or for stripping wool dyeings.

*Example 2*

15 parts of an ordinary commercial mixture of secondary amines containing unbranched alkyl groups, and consisting of about 25 percent of dihexadecylamine and about 75 percent of dioctadecylamine, are heated in a current of nitrogen to about 200° C., 0.15 part of metallic sodium is added, and ethylene oxide is introduced in the form of a finely distributed gas stream until 87.5 parts have been absorbed. The reaction product so formed is a wax-like mass which is easily soluble in water. It can be used as a levelling agent or a stripping agent for wool dyeings.

*Example 3*

65.2 parts of an ordinary commercial mixture of N-alkyl-propylene diamines (melting at 44–48° C.) obtained from tallow, and 56.4 parts of oleic acid are heated in a current of nitrogen for 2 hours at 120–125° C. The temperature of the heating bath is then raised in the course of 1 hour to 160° C. and in the course of a further 2 hours to 200–205° C. Finally, the mixture is stirred for 30 minutes at 200–205° C. under reduced pressure produced by a water jet pump.

50 parts of the resulting acylation product are heated in a current of nitrogen to 150–160° C., 0.25 part of metallic sodium is added, and ethylene oxide is introduced in the form of a finely distributed gas stream at 150–160° C. until 149 parts thereof have been absorbed. When made in this manner, the new product is a soft mass which is readily soluble in water and can be used, for example, as a levelling agent for acid dyestuffs.

*Example 4*

64.8 parts of an ordinary commercial N-alkyl-propylene diamine, which has been produced from soya bean oil and has a melting range of 38–42° C., and 42.4 parts of coconut oil fatty acid (boiling at 101–180° C. under 0.02 mm. pressure of mercury) are heated in a current of nitrogen, while stirring, for 2 hours at 120–125° C. The temperature is then raised in the course of one hour to 160° C., then in the course of a further 2 hours to 200–205° C., and the mixture is finally stirred for 30 minutes at 200–205° C. under reduced pressure produced by a water jet pump. The acylation product so obtained is reacted at about 150–160° C. in the presence of 0.5 percent of metallic sodium (calculated on 1 mol of acylation product), with 80 mols of ethylene oxide. Care is taken to distribute the ethylene oxide in the form of a fine gas stream. The new polyglycol ether derivative is a light wax-like mass, which dissolves easily in water. It can be used, for example, for preventing tippy dyeing of wool.

Example 5

N-cetyl-ethylene diamine, which can be obtained in the usual manner by reacting cetyl bromide with ethylene diamine, is monoacylated with coconut fatty acid in the manner described in Example 4. About 80 mols of ethylene oxide (calculated on 1 mol of acylation product) are additively combined according to the procedure described in Example 4 with the acylation product obtained. The ethylene oxide addition product can be used as a levelling agent in the dyeing of wool.

Example 6

100 parts of wool piece goods are entered at 50° C. into a bath which contains in 4000 parts of water 4 parts of acetic acid of 40 percent strength and 0.5 part of the polyglycol ether derivative obtained as described in Example 1, the bath is heated in the course of ¼ hour to 95° C. and maintained at that temperature for a further ¼ hour. 0.7 part of the complex chromium compound of the dyestuff of the formula

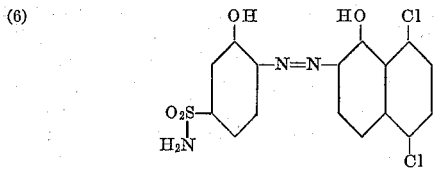

which contains 2 molecules of monoazo-dyestuff bound in complex union to 1 atom of chromium, is dissolved in a small amount of water, and the solution is added to the dyebath. Dyeing is carried on at the boil for ½ hour. The wool piece goods are then rinsed in the cold and dried. There is obtained a level blue dyeing of good fastness to rubbing.

By dyeing unchlorinated and chlorinated wool together in the same bath in the manner described above there is produced a dyeing of practically the same strength on each type of wool, whereas if the dyeing operation is carried out without the addition of the polyglycol ether derivative the chlorinated wool is much more strongly dyed.

Instead of the dyestuff mentioned above, there may be used for dyeing by the same procedure a metal compound of the dyestuff of the formula

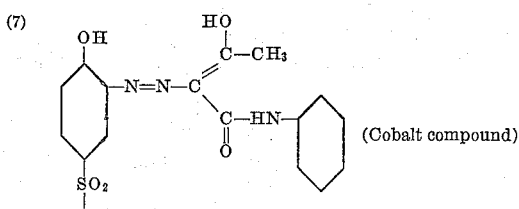
(Cobalt compound)

or

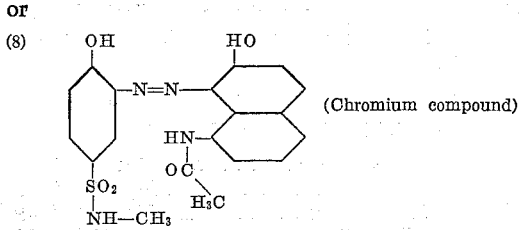
(Chromium compound)

in which two molecules of monoazo-dyestuff contain one atom of metal bound in complex union, or a mixture of these dyestuffs may be used.

Example 7

Wool yarn, which has been dyed from a sulfuric acid bath with 2 percent of the dyestuff of the formula (9) 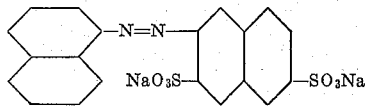

or from a neutral bath with 2 percent of the dyestuff of the formula

(10) 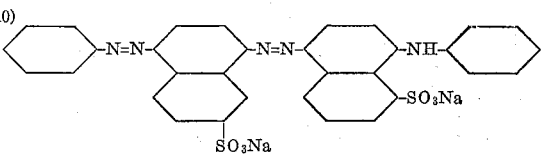

is treated for one hour at the boil in a bath which contains in 5000 parts of soft water 4 parts of the polyglycol ether derivative obtained as described in Example 1 (in the case of dyestuff (10) 2 parts of acetic acid of 40 percent strength are added). The wool is then rinsed in cold water and dried. The dyestuff is removed to a great extent from the dyeings.

In the same manner a wool dyeing produced with the dyestuff of the formula

(11) 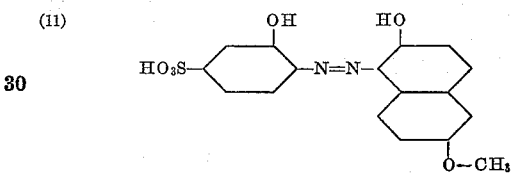

by the usual after-chroming process, can be treated, except that the treatment bath contains, instead of acetic acid, 2 parts of sulfuric acid and 4 parts of oxalic acid.

What is claimed is:

1. As a levelling agent for dyeing with a complex metal dyestuff, in which dyestuff one atom of metal selected from the group consisting of chromium and cobalt is bound in complex union with two molecules of an azodyestuff and which complex metal dyestuff contains at most one member selected from the group consisting of carboxy group and sulfo group, a polyglycolether derivative which contains 40 to 100 —CH$_2$CH$_2$O— groups and in its free base state corresponds to the formula

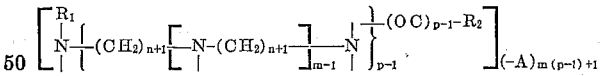

in which R$_1$ and R$_2$ represent aliphatic hydrocarbon radicals containing from 8 to 21 carbon atoms, R$_1$ and

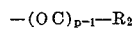

together contain at least 20 carbon atoms, A represents a radical of the constitution

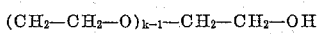

(in which $k$ is a whole number), and $m$, $n$ and $p$ each represent a whole number of at the most 2.

2. As a levelling agent for dyeing with a complex metal dyestuff, in which dyestuff one atom of metal selected from the group consisting of chromium and cobalt is bound in complex union with two molecules of an azodyestuff and which complex metal dyestuff contains at most one member selected from the group consisting of carboxy group and sulfo group, a polyglycolether derivative which in its free basic state corresponds to the formula

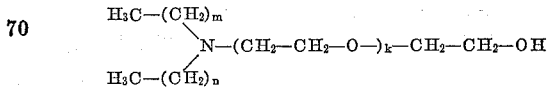

in which $k$ represents a whole number ranging from 39 to 99, $m$ and $n$ represent whole numbers of at least 7, and $m+n$ is at least 18.

3. As a levelling agent for dyeing with a complex metal dyestuff, in which dyestuff one atom of metal selected from the group consisting of chromium and cobalt is bound in complex union with two molecules of an azo-dyestuff and which complex metal dyestuff contains at most one member selected from the group consisting of carboxy group and sulfo group, a polyglycolether derivative which contains 40 to 100 —$CH_2$—$CH_2$—O— groups and in its free base state corresponds to the formula

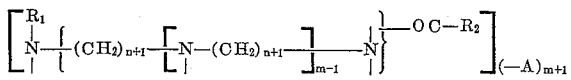

in which $R_1$ and $R_2$ represent aliphatic hydrocarbon radicals, the radicals $R_1$ and —OC—$R_2$ together contain at least 20 carbon atoms and each of these radicals contains from 8 to 21 carbon atoms, A represents a radical of the constitution

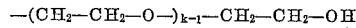

(in which $k$ is a whole number), and $m$ and $n$ each represent a whole number of at the most 2.

4. As a levelling agent for dyeing with a complex metal dyestuff, in which dyestuff one atom of metal selected from the group consisting of chromium and cobalt is bound in complex union with two molecules of an azo-dyestuff and which complex metal dyestuff contains at most one member selected from the group consisting of carboxy group and sulfo group, a polyglycolether derivative which in its free base state corresponds to the formula

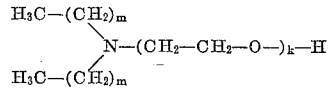

in which $m$ represents a whole odd number ranging from 10 to 18 and $k$ represents a whole number ranging from 50 to 100.

5. As a levelling agent for dyeing with a complex metal dyestuff, in which dyestuff one atom of metal selected from the group consisting of chromium and cobalt is bound in complex union with two molecules of an azo-dyestuff and which complex metal dyestuff contains at most one member selected from the group consisting of carboxy group and sulfo group, a composition of matter consisting substantially of polyglycolether derivatives which in their free base state correspond to the formula

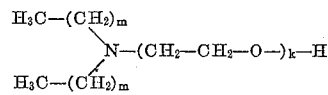

in which $m$ represents a whole odd number ranging from 7 to 20 and $k$ is about 70 as an average, and the value of $m$ is 7 for about 8%, 9 for about 9%, 11 for about 47%, 13 for about 18%, 15 for about 8% and 17 for about 10% of the individual components being present in the composition, the percent values being calculated on the total of amines of the formula

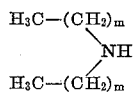

6. As a levelling agent for dyeing with a complex metal dyestuff, in which dyestuff one atom of metal selected from the group consisting of chromium and cobalt is bound in complex union with two molecules of an azo-dyestuff and which complex metal dyestuff contains at most one member selected from the group consisting of carboxy group and sulfo group, a composition of matter consisting substantially of polyglycolether derivatives which in their free base state correspond to the formula

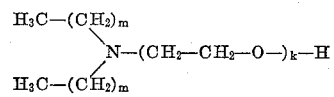

in which $m$ represents a whole odd number ranging from 7 to 20 and $k$ is about 70 as an average, and the value of $m$ is 15 for about 25% and 17 for about 75% of the individual components being present in the composition, the percent values being calculated on the total of amines of the formula

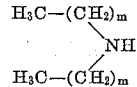

7. As a levelling agent for dyeing with a complex metal dyestuff, in which dyestuff one atom of metal selected from the group consisting of chromium and cobalt is bound in complex union with two molecules of an azo-dyestuff and which complex metal dyestuff contains at most one member selected from the group consisting of carboxy group and sulfo group, a polyglycolether derivative which in its free base state corresponds to the formula

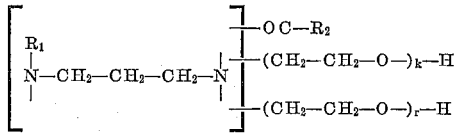

in which $R_1$—N—$CH_2$—$CH_2$—N— represents the radical of an N-alkyl-propylene diamine obtained from tallow, —OC—$R_2$ represents the acyl radical of oleic acid, $k$ and $r$ represent whole numbers, and $k+r$ is about 40.

8. As a levelling agent for dyeing with a complex metal dyestuff, in which dyestuff one atom of metal selected from the group consisting of chromium and cobalt is bound in complex union with two molecules of an azo-dyestuff and which complex metal dyestuff contains at most one member selected from the group consisting of carboxy group and sulfo group, a polyglycolether derivative which in its free base state corresponds to the formula

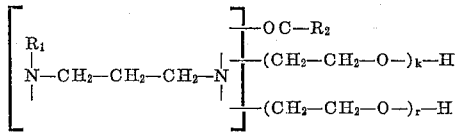

in which $R_1$—N—$CH_2$—$CH_2$—$CH_2$—N— represents the radical of an N-alkyl-propylene diamine obtained from soya bean oil, —OC—$R_2$ represents the acyl radical of coconut oil fatty acid, $k$ and $r$ represent whole numbers, and $k+r$ is about 80.

9. As a levelling agent for dyeing with a complex metal dyestuff, in which dyestuff one atom of metal selected from the group consisting of chromium and cobalt is bound in complex union with two molecules of an azo-dyestuff and which complex metal dyestuff contains at most one member selected from the group consisting of carboxy group and sulfo group, a polyglycolether derivative which in its free base state corresponds to the formula

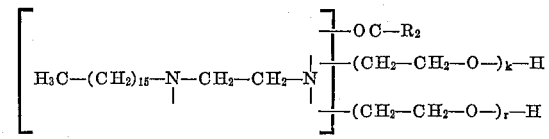

in which —OC—$R_2$ represents the acyl radical of coconut oil fatty acid, $k$ and $r$ represent whole numbers, and $k+r$ is about 80.

References Cited in the file of this patent

UNITED STATES PATENTS

| | | |
|---|---|---|
| 2,103,872 | Schoeller et al. | Dec. 28, 1937 |
| 2,214,352 | Schoeller et al. | Sept. 10, 1940 |
| 2,470,080 | Millson et al. | May 10, 1949 |
| 2,590,073 | Albrecht | Mar. 25, 1952 |
| 2,638,404 | Millson et al. | May 12, 1953 |
| 2,681,354 | Kelley et al. | June 15, 1954 |